United States Patent [19]
Movall et al.

[11] Patent Number: 6,101,557
[45] Date of Patent: Aug. 8, 2000

[54] METHOD AND SYSTEM FOR REMOTE FUNCTION CONTROL AND DELEGATION WITHIN MULTIFUNCTION BUS SUPPORTED DEVICES

[75] Inventors: Paul Edward Movall; Charles Scott Graham, both of Rochester; Shawn M. Lambeth, Pine Island; Daniel Frank Moertl, Rochester, all of Minn.

[73] Assignee: International Business Machines Corporation, Armonk, N.Y.

[21] Appl. No.: 09/087,637

[22] Filed: May 29, 1998

[51] Int. Cl.[7] .................................................. G06F 13/00
[52] U.S. Cl. ........................ 710/2; 710/2; 710/8; 710/62
[58] Field of Search ................................ 710/2, 62, 105, 710/104, 8, 9, 10

[56] References Cited

U.S. PATENT DOCUMENTS

| | | | |
|---|---|---|---|
| 5,692,134 | 11/1997 | Wang et al. | 710/104 |
| 5,751,975 | 5/1998 | Gillespie et al. | 710/126 |
| 5,793,997 | 8/1998 | Briggs | 710/129 |
| 5,832,238 | 11/1998 | Helms | 710/105 |
| 5,850,573 | 12/1998 | Wada | 710/62 |
| 5,960,213 | 9/1999 | Wilson | 710/2 |
| 5,987,533 | 11/1999 | Hong | 710/9 |

OTHER PUBLICATIONS

IBM Technical Disclosure Bulletin, vol. 39, No. 01, Jan. 1996, entitled "Method for Atomic Peer–to–Peer Communication on a Peripheral Component Interconnect Bus," B.E. Bakke et al.

*Primary Examiner*—Thomas C. Lee
*Assistant Examiner*—Chun Cao
*Attorney, Agent, or Firm*—Michael K. Mutter

[57] ABSTRACT

A method, device and system for configuring multifunction I/O device adapters connected to a bus utilizes a slot owner configuration register to identify the ownership of each function slot within the multi-function I/O device adapter. An intelligent I/O device adapter or controller within the multi-function I/O device adapter may control other I/O adapters located in other function slots through the information provided in the slot owner configuration register. Ownership of each slot is initially set, upon power up, to the host unit or processor complex. Thereafter, each intelligent I/O device adapter or controller determines the presence of adapters at other function slots to be controlled, and records this information in the slot owner configuration register.

18 Claims, 6 Drawing Sheets

METHOD AND SYSTEM FOR REMOTE FUNCTION CONTROL AND DELEGATION WITHIN MULTIFUNCTION BUS SUPPORTED DEVICES

CROSS REFERENCE TO RELATED APPLICATION

The present invention is related to U.S. Pat. No. 6,023,736 entitled "System for dynamically configuring I/O device Adapters where a function configuration register contains ready/not ready flags corresponding to each I/O device adapter". The U.S. Pat. No. 6,023,736 specification is hereby incorporated by reference.

BACKGROUND OF THE INVENTION

1. Technical Field of the Invention

This invention is related to methods, devices, and systems for configuring I/O devices. More particularly, this invention relates to the delegation and control of one or more functions in a multi-function device adapter. The present invention even more particularly relates to configuring multi-function I/O device adapters to facilitate functional control and delegation of one or more functions of a multifunction device adapter by a device located at another function slot within the multifunction adapter.

2. Description of Related Art

The peripheral component interconnect ("PCI") local bus is an industry standard I/O bus that interconnects computer processor complexes to I/O device adapters. The computer processor complex typically contains a central processing unit (CPU) and system main storage facility. A PCI I/O device adapter contains hardware, and possibly additional processors and programming to interconnect I/O devices such as disks, computer network interfaces, and other peripherals to the processor complex and to control the functions of these I/O devices.

The PCI local bus specification was developed and is controlled by a special interest group formed of a variety of I/O device and computer system vendors that are influential within the personal computer and PC server industry. This specification is defined expressly as a higher performance replacement for other existing I/O bus architectures such as the IBM microchannel and extended industry standard architecture ("EISA").

As such, the PCI local bus specification represents the dominant I/O bus architecture within a very large segment of the computer industry. Furthermore, the PCI local bus specification has been embraced outside of this segment by vendors that participate primarily in other markets, such as enterprise-class network server and mainframe computers. Thus, the scope of computer system and I/O device products that employ PCI local bus implementations is rapidly becoming the majority within the overall computer industry.

In the PCI Local Bus Specification, the physical/electrical connections to the PCI bus and PCI bus signaling protocols specify the addressing of a particular PCI bus connection, or "agent slot," using the PCI Local Bus "Configuration Read" or "Configuration Write" signaling protocols. This is accomplished through use of a "device number", which serves to identify a particular connection or agent slot. This configuration protocol allows the Processor Complex to individually address each PCI Local Bus connection using a physical selection signal that is part of the PCI bus signal definitions, and to assign to each I/O Device Adapter a range of Processor Memory addresses by which the processor may subsequently communicate with the corresponding I/O device adapter.

FIG. 1 illustrates the basic elements of a common PCI Local bus implementation, comprised of a Processor Complex 100 connected to a PCI backplane 200 which in turn is connected to one or more I/O devices 280. The processor complex 100 includes a central processing unit ("CPU") 110 and a memory 120 interconnected via a processor bus 130.

In a conventional PCI local bus implementation, the PCI backplane 200 is normally provided on the motherboard with a PCI local bus 230. The PCI local bus 230 is typically connected to the processor memory bus 130 by a PCI host bridge 210. One or more PCI connectors 205 then connect one or more removable PCI multi-function devices 260 to the PCI local bus 230. While FIG. 1 illustrates only a single removable PCI multi-function device 260, as already explained, the PCI local bus specification supports multiple bus connections or "agent slots". Thus, multiple multifunction devices 260 may be connected to the PCI local bus 230. Although the present application is primarily directed to operation of removable PCI multi-function devices 260, the PCI specification also supports PCI devices, and both single and multi-function devices need not be removable.

As already explained, a PCI host bridge 210 interconnects the PCI local bus 230 to the processor memory bus 130 over which the CPU 110 and memory 120 communicate. The PCI host bridge 210 supplies information between the PCI local bus 230 and the processor memory bus 130, converting information from the processor complex 100 to the PCI bus specification, and converting information obtained from the PCI local bus 230 from the PCI local bus specification to an information format readable by the processor complex 100. A PCI multi-function device 260, as illustrated in FIG. 1, allows multiple functions to be accessed with a single PCI "device number" at a single PCI bus connection or agent slot.

The removable PCI multi-function device 260 includes a function router 270 for routing data and/or control signals between the processor complex 100 and a selected function of the removable PCI multi-function device. An I/O device adapter 252,254 controls each function of the removable PCI multi-function device 260. Each I/O device adapter can connect to a single or multiple I/O devices 280. Typically, the function router 270 includes a multiplexer to route the data and/or control signals between the processor complex 100 and a selected one of the multiple I/O device adapters 252,254.

In such a conventional system, a PCI multifunction device 260 collects multiple PCI I/O device adapter functions to a single PCI local bus connection or agent slot. This allows increasingly dense physical integration and increased functionality as components shrink in size and increase in power. Further, multiple functions with a single removable PCI multi-function device 260 enables an increased number of I/O device adapters without adding more agent slots on the PCI local bus 230 or its associated PCI back plane 200.

In FIG. 1, the I/O device adapters 252,254 have been integrated into a single PCI multi-function device 260 through the use of the function router 270. To enable the processor complex 100 to select a particular I/O device adapter, or "function" resident at this specific PCI bus connection or "agent slot", the PCI local bus specification configuration protocol appends to the device number a function number having 3 bits, thus accommodating functions 0 to 7. In this fashion, a single PCI multi-function device 260 may accommodate up to 8 single function devices through the use of this extended definition. Thus, the processor complex 100 may specify any of the function numbers 0 to 7 controlled by the PCI multi-function device 260, in essence allowing each PCI bus connection or "agent slot" to accommodate up to 8 I/O device adapters.

Under this system, single function devices are accommodated by this extended definition by assigning single function devices with a 3 bit code indicative of "function 0". In essence this treats a single function PCI device as a simplified case of a multi-function device whose function router component only implements one function: function 0.

The PCI multi-function device 260 is accordingly architecturally capable of incorporating up to 8 I/O device adapter elements within a single device, requiring a single PCI agent slot on the PCI local bus. It is accordingly apparent that the function router 270 of FIG. 1 must facilitate the sharing of the single PCI agent slot among multiple I/O device adapter functions incorporated within the multi-function device. In particular, during configuration read and write protocols, the function router 270 uses the function number from this protocol to route the arguments of this protocol between the PCI local bus and the assigned PCI I/O device adapter 252,254 and associated I/O device 280.

One limitation of the PCI local bus specification is the lack of any provision for the determination of which functions of a multi-function device must be presented directly to the host (normally the processor complex) through the PCI local bus function configuration space. Within a multi-function device, it is desirable to allow an I/O device adapter at one function space of the multi-function device to perform complete access and control of an I/O device adapter present at another function space based on the overall configuration of the I/O device adapters attached to the multi-function device.

An example of this type of configuration activity is that of a controller which will perform host or processor complex interface activity on behalf of one or more generic I/O device adapters attached to separate function locations of the multi-function device. In this circumstance, the PCI bus specification does not have any system for allowing one function of the multi-function device to be controlled or accessed by another function within the multi-function device. Thus, under the current PCI bus specification, each function of the multi-function device must be accessed and controlled by the processor complex as local control of one function by an I/O device adapter at another function space within the multi-function device is not contemplated by the current PCI bus specification.

SUMMARY OF THE INVENTION

An object of the present invention is to improve bus specifications such as the current PCI bus specification by allowing one function of a multifunction device adapter to be controlled or accessed by another functional slot within the multi-function device adapter.

Another object of the present invention is to reduce load on the host unit or central processor by allowing certain functions of the multi-function I/O device adapter to be controlled locally by a controller provided at another function slot thereof.

Another object of the present invention is to identify control of each function or slot of a multi-function I/O device adapter or controller and record this information so that such a function may be efficiently controlled by a controller within the multi-function device, or alternatively, by a host unit or processor complex.

It is a further object to provide a multi-function device or device adapter which contains configuration information wherein a plurality of functions attached to the multi-function device can be internally configured for communication to the controller, and can be essentially invisible to the host processor.

The objects of the present invention are achieved by providing a slot owner configuration register which identifies the location of the slot controlling the function of each function of the multi-function I/O device. In this way, the routing/controlling facility can keep track of which I/O device adapters are being controlled by the host unit or processor complex, and also, which are being controlled by a controller contained within the multi-function I/O device.

Software is provided in each intelligent I/O device adapter or controller to enable each controller to aid in the configuration of the slot owner configuration register provided in the function routing control facility. Based on this software, a controller can determine which slots it owns, which slots are owned by another controller, which slots are to be owned by the owned controller, and which slots are owned by the host unit or processor complex.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF PREFERRED EMBODIMENTS

Figure 1A:
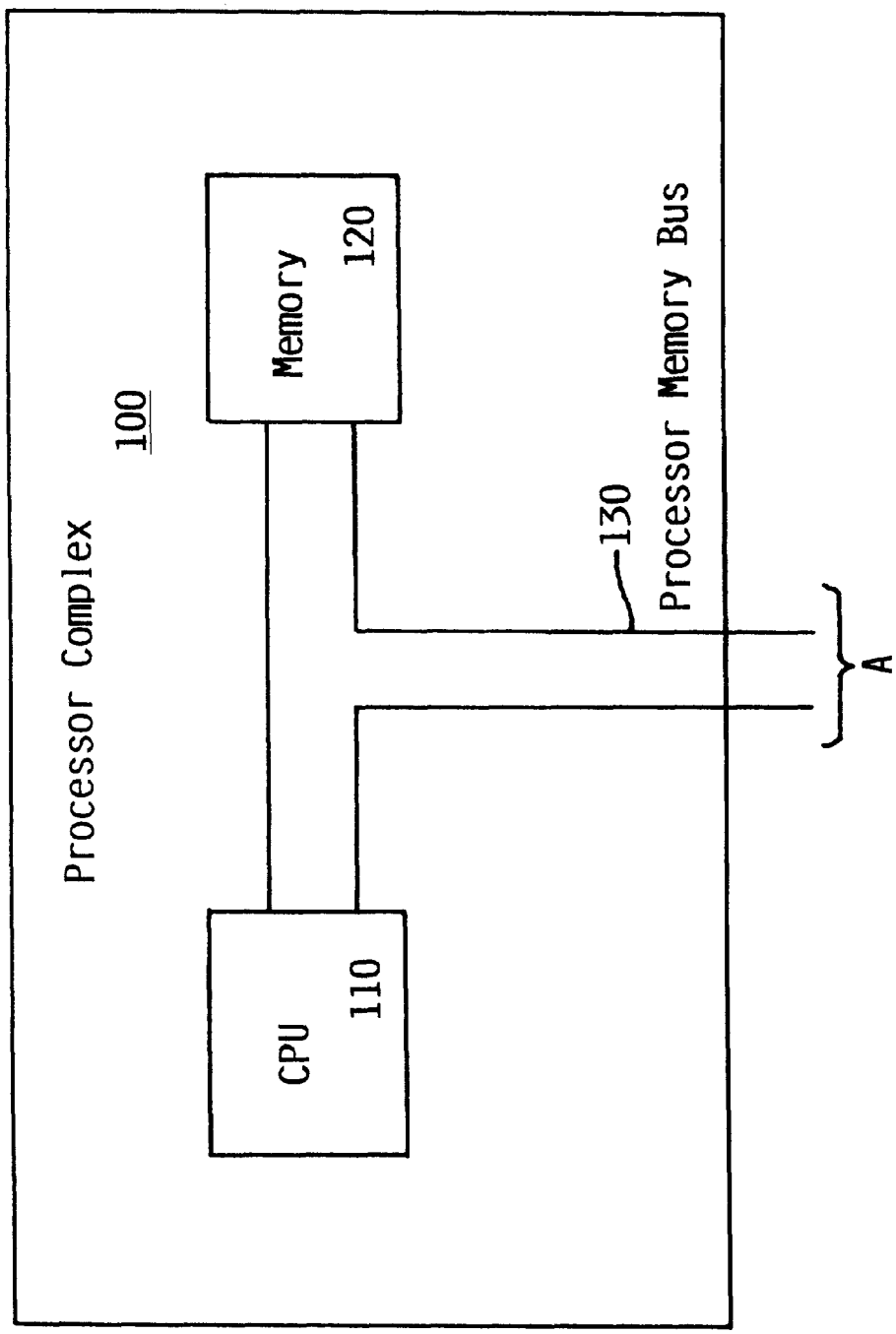
FIG. 1 illustrates a conventional computer system implementing the PCI local bus specification and including a multi-function PCI device connected to plural I/O devices.
Figure 1B:
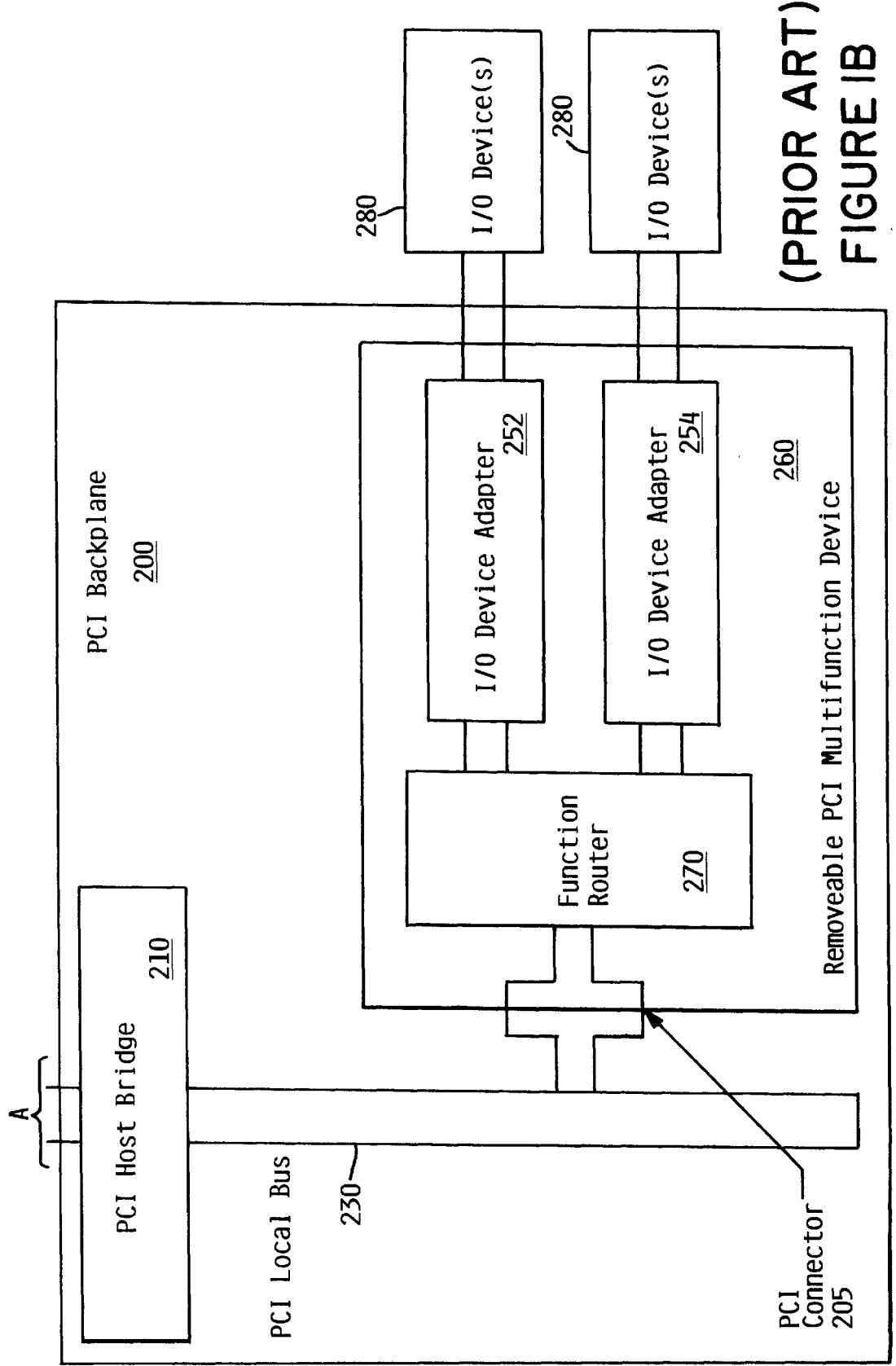
Figure 2A:
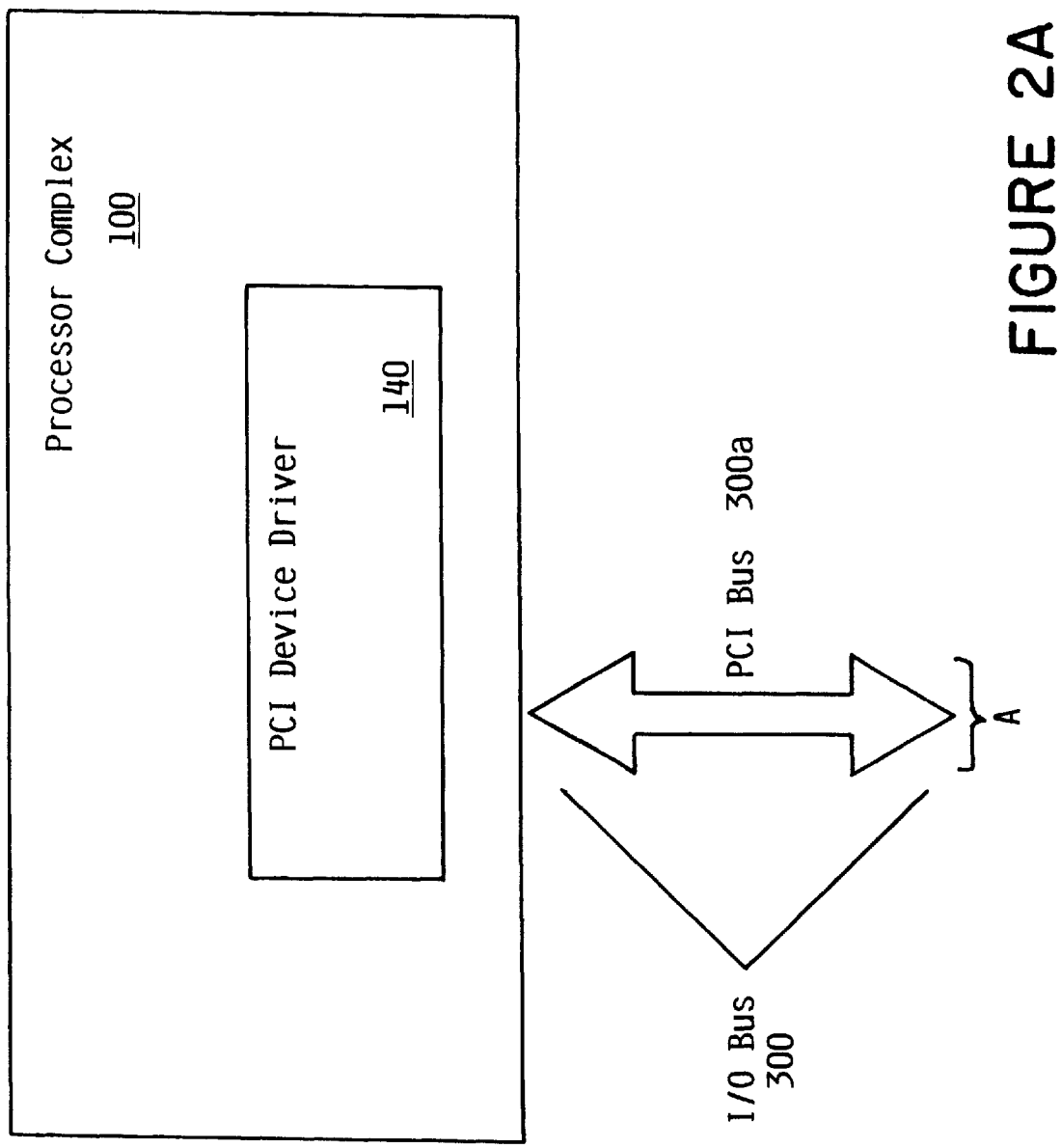
FIG. 2 illustrates an embodiment of the present invention illustrating the principles of remote function control and delegation within a multi-function bus supported device according to the teachings of the present application.
Figure 2B:
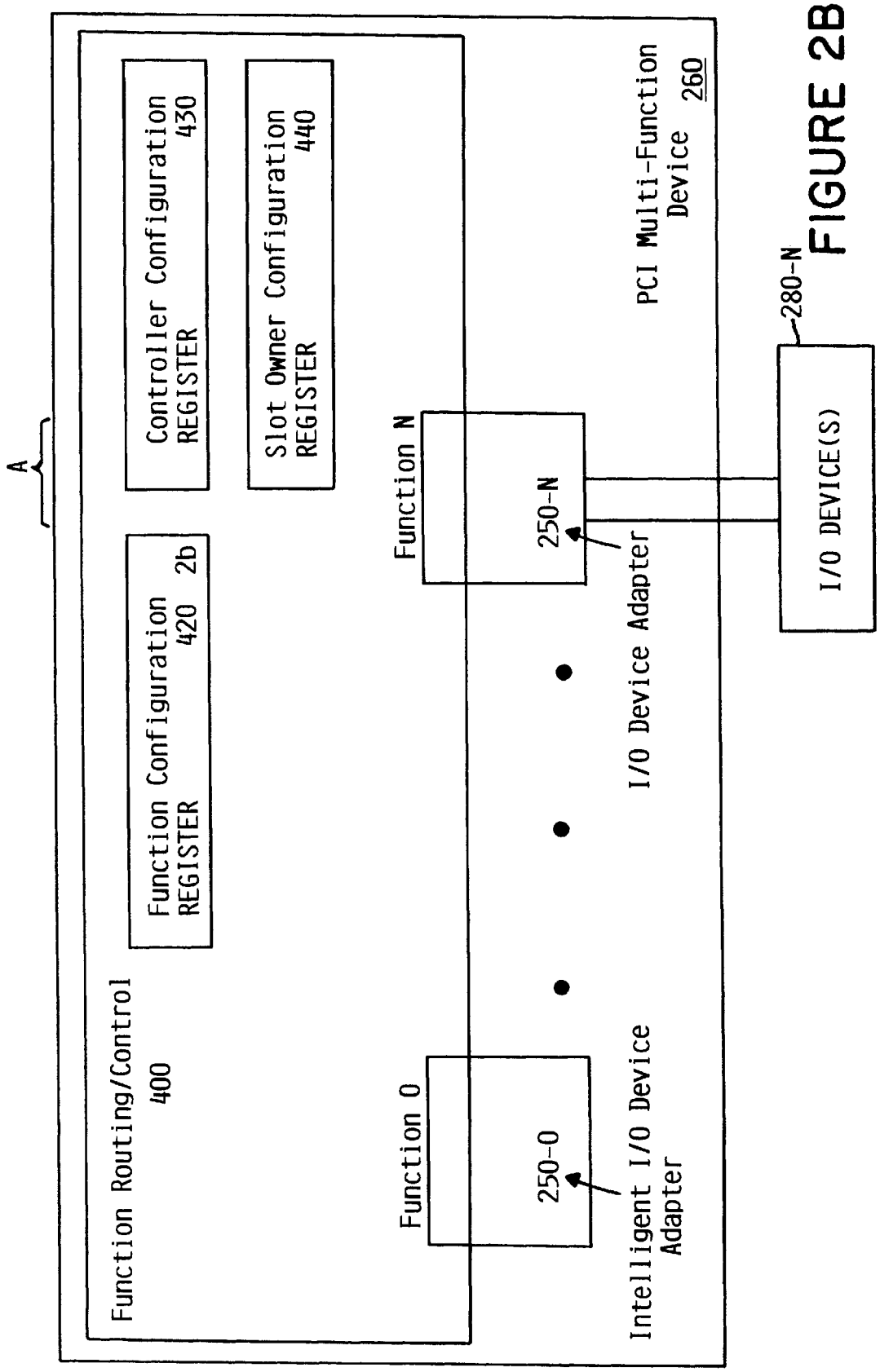

FIG. 2 schematically illustrates the application of the principles of the present invention to a bus architecture of the type described in the FIG. 1 conventional art. The processor complex 100 of FIG. 2 is equivalent to the process complex 100 of FIG. 1, and includes a central processing unit (CPU) 110 and memory 120, connected via a processor memory bus 130. FIG. 2 additionally illustrates a PCI device driver 140 that controls and otherwise manages the I/O devices provided on an I/O bus 300. This I/O bus 300 is, in one preferred embodiment, a PCI bus 300(*a*), and typically would include the PCI host bridge 210, and PCI local bus 230 of the conventional art of FIG. 1.

Each multi-function device 260 of FIG. 1 of course includes a function router 270. According to the teachings of the present invention, the multi-function device 260 is instead provided with a function router that also enables control of one or more functions by another function within the multi-function device 260. Accordingly, this block is designated in FIG. 2 as function routing/control facility 400. The function routing/control facility 400 is located in the multifunction device 260 and routes data and/or control signals between the I/O device driver 140 and the I/O device adapters 250-0 to 250-n which correspond in number to the number of I/O devices 280-n connected to the multi-function device 260. The function routing/control facility 400 includes a function configuration register 420, controller configuration register 430 and a slot owner configuration register 440.

The I/O bus 300 in the preferred embodiment of FIG. 2 is preferably a PCI local bus conforming to the PCI local bus specification, and interconnects the processor complex 100 and the PCI multi-function device 260. While a PCI local bus will normally connect a processor complex 100 to one or more single or multifunction devices, the PCI local bus may also be a secondary bus connecting single or multi-function devices provided on the secondary bus to a host unit bridging the primary PCI bus to a secondary PCI bus as described in the PCI Local Bus Specification, Revision 2.1, dated Jun. 1, 1995. Thus, the specification of the present application uses the term "host unit" to refer to the processor complex 100 or any other processing device connected to the head of a primary, secondary or other PCI bus. The PCI bus 300(*a*) is provided to transmit all signals between the processor complex 100 and the PCI multi-function device adapter 260 as specified in accordance with the PCI local bus specification.

In accordance with the teachings of the present application, the PCI device driver 140 follows the protocol described further in the above mentioned related application R997-066 entitled DYNAMIC CONFIGURATION SYSTEM, APPARATUS AND METHOD FOR DYNAMICALLY CONFIGURING I/O DEVICE ADAPTERS. The operation of the present invention is preferably implemented prior to the conclusion of initialization as performed in accordance with the teachings of the above mentioned application.

In accordance with the teachings of the instant application, the function routing/control facility 400 may be connected to one or more intelligent I/O device adapters 250-0 to 250-n capable of assuming and performing control functions required by other, non-intelligent device adapters.

In one preferred embodiment of the present application, it is assumed that only function 0 will be selected for such an intelligent device adapter. However, it is within the contemplation of the present application that function locations other than function 0 may be the locations of intelligent device adapters supported by the system of the present application, and that more than one intelligent device adapter may be utilized in a single PCI multi-function device 260.

The function configuration register 420 allows an intelligent I/O device adapter to determine which slot it is attached to within the PCI multi-function device 260. The function configuration register is explained in greater detail in the above-mentioned copending application DYNAMIC CON-FIGURATION SYSTEM, APPARATUS AND METHOD FOR DYNAMICALLY CONFIGURING I/O DEVICE ADAPTERS. The function configuration register 420 also indicates the status of each function connected to an I/O device adapter 252,254 of the multifunction device 260.

The function routing/control facility 400 is also provided with a controller configuration register 430. The controller configuration register 430 contains information of the configuration of each I/O device adapter 250-0 to 250-n. For example, the information contained in the controller configuration register 430 may specify whether an I/O device adapter 250-0 to 250-n is present, can be controlled, or can be a controller. Since the controller configuration register 430 contains information of each I/O device 250-0 to 250-n connected to the multi-function device 260 the function routing/control facility 400 can determine which functions 0 to n are utilized for an I/O device adapter 250. This information can be similarly determined by an intelligent I/O device adapter or controller 250-Int which may be provided at one or more function locations 0 to n. This allows a controller 250-Int, located at function 0 in FIG. 2, to determine which other slots of the PCI multi-function device 260 also contain controllers 250-Int or functions to be controlled.

The function routing and control facility 400 of the PCI multi-function device 260 is also provided with a slot owner configuration register 440 which is used to assign the ownership of a slot to another slot. During a power-up initiated setup procedure, this slot owner configuration register 440 is initially set so that each function of the PCI multi-function device 260 is "owned" by the host unit located at the other end of the PCI bus 300(*a*). In the example of FIG. 2, the processor complex 100 via the PCI device driver 140 is the host unit. However, as will be illustrated in further detail with respect to FIGS. 3 and 4, the slot owner configuration register can be updated for a given slot 0 to n to indicate that that slot is owned by one of the other slots of the PCI multi-function device 260.

In the example where function 0 is an intelligent I/O adapter or controller of functions 1,2, then the host processor, the processor complex 100 of FIG. 2, does not actually see functions 1 and 2, but rather sees only function 0, the location of the intelligent I/O adapter or controller.

Figure 3:
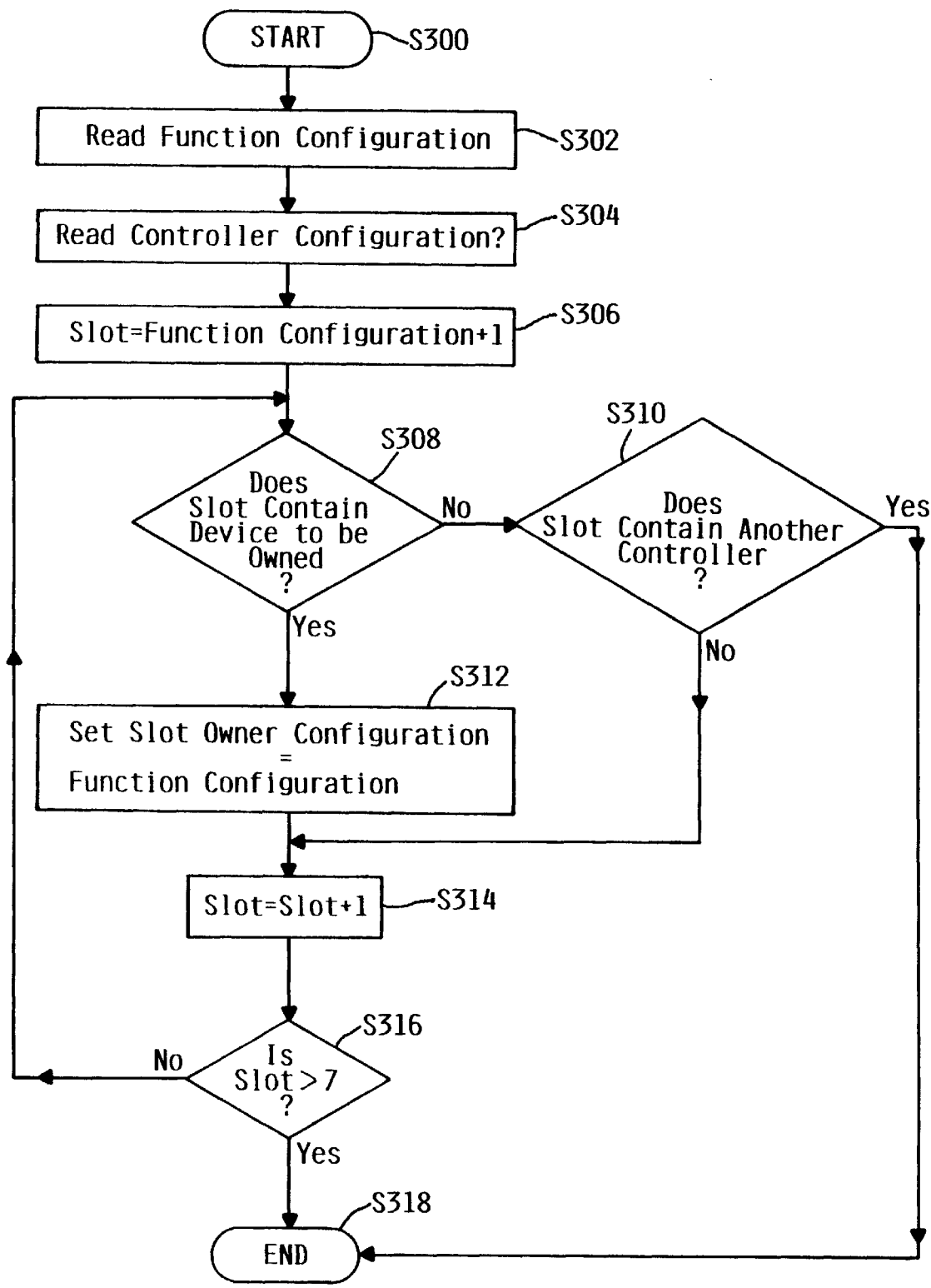
FIG. 3 illustrates a high level flow chart for identification of function control within the I/O device adapter 250-0 according to one preferred embodiment of the present invention.

FIG. 3 illustrates a program implemented by intelligent I/O device adapter or controller 250-Int to identify slot ownership within the multi-function device 260. FIG. 3 begins at step S300. At step S302, the intelligent I/O device adapter or controller 250-Int determines its own slot from its flag location within the function configuration register 420.

At step S304, the intelligent I/O device adapter or controller 250-Int reads the controller configuration register 430 associated with each function or slot 0 to n to determine the attributes of each I/O device adapter 250. It is therefore possible to determine from the controller configuration register 430 which function slots, 0–7 in the preferred embodiment, contain intelligent I/O device adapters or controllers 250-Int. Thus, from controller configuration register space 430, the intelligent I/O device adapter or controller 250-Int running the subroutine of FIG. 3 can determine which multi-function device function slots 0 to n of the PCI multi-function device 260 contain I/O device adapters 250.

In the sub-routine of FIG. 3 the intelligent I/O device adapter or controller 250-Int assumes that all functions it controls are numerically higher than its own. Thus, in the embodiment of FIG. 3 an intelligent I/O device adapter or controller 250-Int at slot 4 can not control an I/O device adapter 250 at slot 3. At step S306, the variable SLOT is incremented from the own slot location of the intelligent I/O device adapter or controller 250-Int. Thus, if the controller 250-Int is at slot 4, SLOT is incremented to five.

Figure 4:
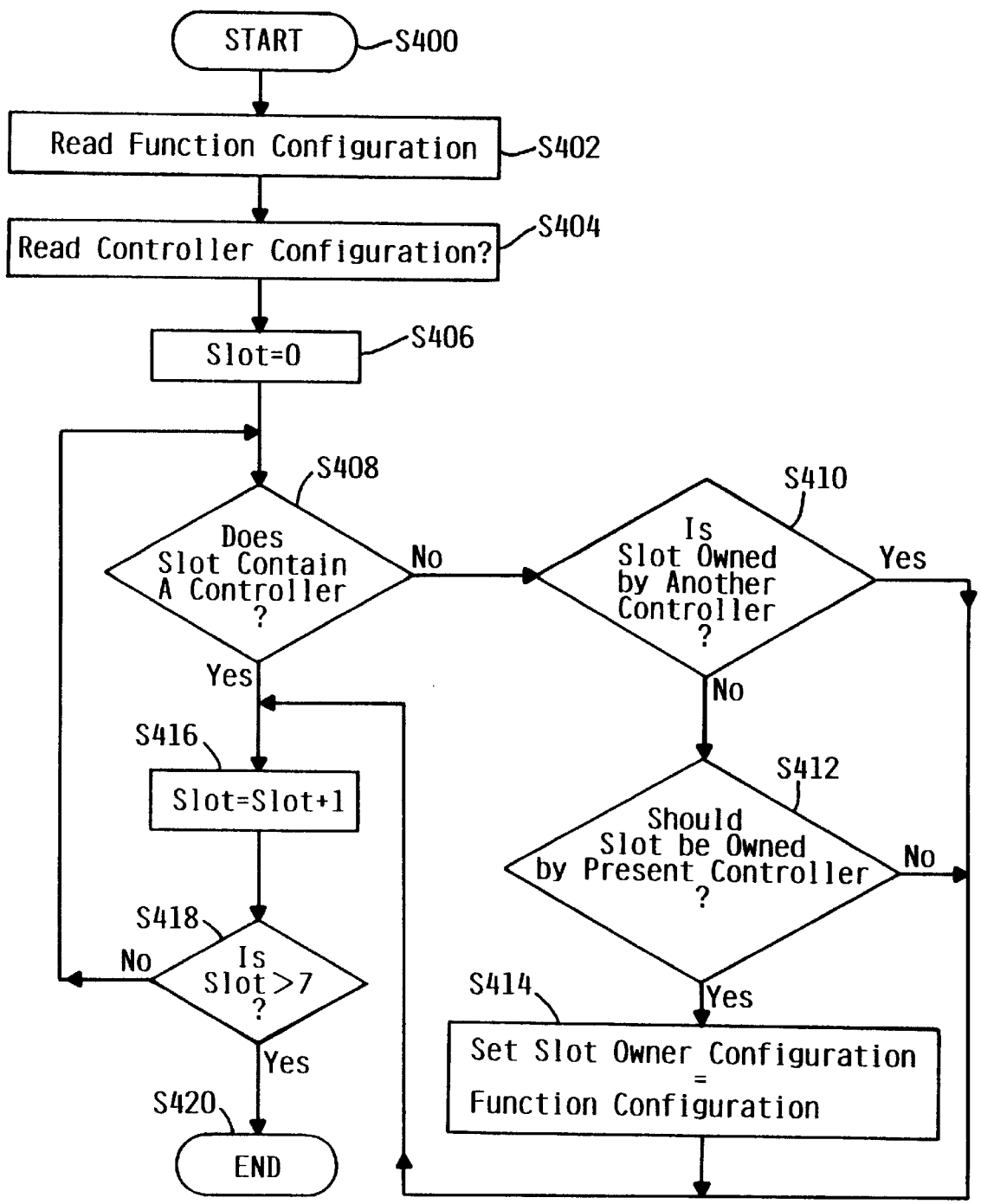
FIG. 4 illustrates a high level flow chart implemented by the PCI device driver 140 identifying those functions which have not been assigned to an I/O device adapter 250 at another function slot in the PCI multi-function device 260.

Subsequently the routine of FIG. 3 tests the condition of each additional function location. Since, in the embodiment of FIG. 3, each controller can control only higher numerical slots, each intelligent I/O device adapter or controller 250-Int need not poll those slots lower than its own. It should be understood, however, that within the teachings of the present application, one could simply have each intelligent I/O device adapter or controller 250-Int poll each available slot rather than only the slots numerically higher than its own as is illustrated in FIG. 4.

At step S308, the subroutine of FIG. 3 determines if the slot contains a device to be owned by that controller. This is determined by polling the controller configuration register space 430 for that slot to determine if it contains a description of an I/O device adapter 250 to be controlled. If a slot contains an I/O adapter 250 to be controlled by the intelligent I/O device adapter or controller 250-Int, a location within the slot ownership register 440 for that slot identifies the slot of the intelligent I/O device adapter or controller 250-Int.

If the slot n does not contain an I/O device adapter 250-n to be controlled, step S310 of the subroutine of FIG. 3 determines if the slot contains another controller. If the slot contains another controller, the subroutine of FIG. 3 assumes that subsequent slots will not be controlled by itself and thus does not continue to poll additional slots. Accordingly, if the answer at step S310 is yes, then the subroutine proceeds to the End at step S318 for that intelligent I/O device adapter or controller.

It is accordingly apparent that in the subroutine of FIG. 3, an intelligent I/O device adapter or controller 250-Int-a cannot control slots present with higher slot numbers than that of another intelligent I/O device or controller 250-Int-b. This assumption is made to enhance processing efficiency. However, within the teachings of the present application, of course, it is possible for each slot to be polled by each device so that these constraints need not exist as illustrated in FIG. 4.

Steps S308 and S310 need to also account for one other possibility; that the function slot is empty. In the preferred embodiment, an empty slot is assigned to the intelligent I/O device adapter or controller 250-Int immediately proceeding it. Thus, an empty slot is determined to be a slot owned or controlled by the controller running the routine. However, it is within the contemplation of the present application that empty slots could be assigned in another manner or could be ignored completely, should this be deemed desirable.

As already mentioned, if a slot is determined to be owned by the intelligent I/O device adapter or controller 250-Int, the slot owner configuration for that slot is set to the function location number of the controller running the subroutine of FIG. 3 as shown in step S312. At step S314, the slot number is updated, and steps S308, S310 and S312 are iteratively performed until either another controller is located, or all slots remaining in the multi-function device 260 have been considered. Accordingly, at S316, once the slot number reaches the slot number of the highest numerical function n of the PCI multi-function device 260, the subroutine proceeds to the end S318.

As a result of the subroutine of FIG. 3, the slot ownership configuration register 440 is configured to identify the function location of the owner of each slot 0-n controlled by an intelligent controller 250-Int within the multi-function device 260. The controller configuration register 430 identifies those slots that are intelligent I/O device adapters or controllers. The slot owner configuration register 440 may be examined to determine which slot is controlling the function present at that location. Thus, if slot 3 is to be controlled by slot 1, the portion of the slot ownership configuration register 440 associated with slot 3 will identify slot 1 as containing the controlling intelligent I/O device adapter or controller 250-Int.

An alternative embodiment of the flow chart of FIG. 3 is illustrated in FIG. 4. Once again, this alternative embodiment's subroutine is installed in each intelligent I/O device adapter or controller and is executed by each controller 250-Int in turn. Steps S400, S402 and S404 of FIG. 4 proceed identically the steps S300, S302 and S304 of FIG. 3. However, since in the embodiment of FIG. 4, it is possible for a controller to be present at any function location, and since it is further possible for any slot to be owned by any controller, at step S406, the slot number is initially set to 0.

At step S408, the subroutine determines whether slot 0 contains a controller. This could be the controller 250-Int currently running the routine of FIG. 4 or another controller. If the slot contains a controller, that slot need not be assigned to another controller. Accordingly, the subroutine proceeds to step S416 where the slot number is incremented. At step S418, the slot number is compared to the maximum possible number of slots, and if each slot has been tested in step S418, the program proceeds to the End at step S420. Otherwise, steps S408–S418 are repeated.

At step S408, if the slot did not contain a controller, the slot owner configuration register is monitored, and if the slots ownership register identifies that another controller owns the slot, the subroutine proceeds to steps S416 and S418, as that slot does not require ownership to be again established.

If the slot is not owned by another controller, as determined by step S410, then step S412 determines whether the slot should be owned by the present controller 250-Int. If the answer to this question is yes, then the location in the slot ownership register 440 for that slot is set to identify the slot of the intelligent I/O device adapter or controller 250-Int running the routine. Thus, the ownership by the controller 250-Int can be identified. If the slot is not to be owned by the present controller 250-Int, the subroutine proceeds directly to incrementing the slot number at step S416. Accordingly, as each intelligent I/O device adapter or controller 250-Int identifies a slot to be controlled by itself, its function configuration is loaded into the location of the slot owner configuration register 440 associated with the slot to be controlled.

It should be noted that it is possible for more than one controller to think that a slot should be owned by itself. In such a situation, however, the first intelligent I/O device adapter or controller to claim that slot will control it. This is because the step S410 prevents a slot already owned by another controller from being identified as owned by the controller doing the polling under the FIG. 4 subroutine.

It should be understood that slots which are not controlled by any controller contained within the multi-function device will normally be controlled directly by the PCI device driver 140 contained within the processor complex 100 or another host unit. Accordingly, each function within the PCI multi-function device may be an intelligent I/O device adapter or controller 250-Int, may be controlled by an intelligent I/O device adapter or controller 250-Int, or by the processor complex or host unit 100.

The present invention allows for increased flexibility in the configuration of devices employing bus configurations such as PCI busses. The concepts of the present invention allow such systems to employ control of one function within a multi-function device from another functional location of the multi-function device, instead of relying on the host or processor complex for the controlling of each function. Thus, some of the functions of the multi-function device can be internally configured for communication to the intelligent I/O device adapter or controller 250-Int and can be essentially invisible to the host unit such as the processor complex 100. This increased flexibility allows substantial performance advantages by decreasing the processing load on the processor complex 100 or other host unit.

The invention being thus described, it will be obvious that the same may be varied many ways. Such variations are not to be regarded as departure from the spirit and scope of the invention, and all such modifications as would be obvious to one skilled in the art are intended to be included within the scope of the following claims.

What is claimed is:

1. A processing system including a multifunction bus supported device comprising:
    a host processor;
    a multifunction bus supported device;
    a local bus connecting said host processor and said multifunction bus supported device;
    said multifunction bus supported device including,
        a plurality of I/O device adapters, at least one of said I/O device adapters being a controller controlling another I/O device adapter of said bus supported device, at least one of the remaining I/O device adapters being a controlled adapter,
        a function routing/controlling facility connected between said local bus and said I/O device adapters, said function routing/controlling facility transmitting data and/or control signals between said host processor and at least one of said plurality of I/O device adapters via said local bus, said function routing/controlling facility routing control of each said controlled adapter to one of the controller and said host processor.

2. The processing system of claim 1 wherein said host processor includes a central processing unit and memory connected thereto via a processor memory bus.

3. The processing system of claim 1 further comprising a host bridge interconnecting said processor complex memory bus and said local bus.

4. The processing system of claim 1, further comprising I/O devices connected to at least some of said I/O device adapters.

5. The processing system of claim 1,
    wherein said function routing control facility includes a function configuration register and a controller configuration register.

6. The processing system of claim 1,
    wherein said controller determines slot ownership of the controlled adapters.

7. The processing complex of claim 1,
    wherein said controlled adapters controlled by said controller are essentially invisible to said host processor.

8. The processing system of claim 1,
    wherein said local bus is a secondary bus and said host processor is part of a bridge device between a primary bus and the secondary bus.

9. A multifunction bus supported apparatus communicating with a host processor over a communication bus and having plural function slots, comprising:
    plural I/O device adapters including,
        at least one controller capable of controlling another I/O device adapter, and
        at least one controlled I/O device adapter; and
    a function routing/controlling facility having said I/O device adapters connected thereto, said function routing/controlling facility transmitting data and/or control signals between the I/O device adapters and a bus connected to said function routing/controlling facility; and
    a slot owner configuration register identifying the controller or host processor controlling each of said controlled I/O device adapters.

10. The apparatus of claim 9, further comprising I/O devices connected to at least some of said plural I/O device adapters.

11. The apparatus of claim 9,
    wherein said function control/routing facility includes a function configuration register and a controller configuration register.

12. The apparatus of claim 9,
    wherein said controller determines slot ownership of said controlled I/O device adapters.

13. The apparatus of claim 9,
    wherein said controlled I/O device adapters controlled by said controller are essentially invisible to said host processor.

14. The apparatus of claim 9, wherein said local bus is a secondary bus and said host processor is part of a bridge device between a primary bus and the secondary bus.

15. A multifunction device communicating with a host processor over a communication bus and having plural function slots, comprising:
    plural I/O device adapters including,
        at least one controller capable of controlling another I/O device adapter, and
        at least one controlled I/O device adapter; and
    a function routing/controlling facility having said I/O device adapters connected thereto, said function routing/controlling facility transmitting data and/or control signals between the I/O device adapters and a bus connected to said function routing/controlling facility so that controlled I/O device adapters and their associated I/O devices being controlled by said controller can not be viewed by the host processor.

16. A multifunction device communicating with a host processor over a communication bus and having plural function slots, comprising:
    plural I/O device adapters including,
        at least one controller capable of controlling another I/O device adapter, and
        at least one controlled I/O device adapter;
    a function routing/controlling facility having said I/O device adapters connected thereto, said function routing/controlling facility transmitting data and/or control signals between the I/O device adapters and a bus connected to said function routing/controlling facility so that controlled I/O device adapters and their associated I/O devices being controlled by said controller are essentially invisible to the host processor; and
    a slot owner configuration register identifying the controller or host processor controlling each of said controlled I/O device adapters.

17. A method of handling functionality of a multifunction device having plural I/O device adapters at plural function slots, said multifunction device being connected to a host unit over a communications bus so that said functionality is essentially invisible to said host unit comprising:

a) supplying at least one controller as an I/O device adapter, all I/O device adapters not controllers being controlled I/O device adapters;

b) providing a slot owner configuration register to identify the host unit or controller controlling each said controlled I/O device adapter;

c) for each slot owned by said controller as identified in said slot owner configuration register, controlling the controlled I/O device adapter present at said slot with said controller.

18. The method of claim 17,
wherein each I/O device adapter controlled in said step c) is essentially invisible to said host unit.

* * * * *